United States Patent [19]

Kihl et al.

[11] Patent Number: 5,764,957
[45] Date of Patent: Jun. 9, 1998

[54] SYSTEM FOR ESTIMATING POINT-TO-POINT TRAFFIC DEMAND

[75] Inventors: Gye Tae Kihl; Hyoung Geun Yu; Jae Yeol Kim, all of Seoul, Rep. of Korea

[73] Assignee: Korea Telecommunication Authority, Seoul, Rep. of Korea

[21] Appl. No.: 554,861

[22] Filed: Nov. 7, 1995

[30] Foreign Application Priority Data

May 8, 1995 [KR] Rep. of Korea ............... 1995/11335

[51] Int. Cl.$^6$ ............................................. G06F 15/173
[52] U.S. Cl. ............... 395/500; 395/200.5; 395/200.56; 395/200.65
[58] Field of Search ..................... 395/500, 180, 395/181, 200.1, 200.15; 364/436, 940.3, 940.68, 942.08; 370/232, 400, 237

[56] References Cited

U.S. PATENT DOCUMENTS 4,979,118 12/1990 Kheradpir ................... 364/436
5,289,462 2/1994 Ahmadi et al. ................ 370/232
5,408,683 4/1995 Ablay et al. .................. 455/33.1
5,522,046 5/1996 McMillen et al. ............. 395/200.1
5,583,860 12/1996 Iwakawa et al. .............. 370/232

*Primary Examiner*—Kevin J. Teska
*Assistant Examiner*—Dan Fiul
*Attorney, Agent, or Firm*—Mechant Gould Smith Edell Welter and Schmidt

[57] ABSTRACT

A system for a point-to-point traffic demand estimation, which is one of the data analyzing procedures necessary for network management, on the basis of measured traffic data for communications network. This system includes setting an initial point of an estimated value as zero, iteratively and temporarily incrementing the estimated value by the product of a directional vector by a step size, and comprising constraints using both the incremented estimated value and the directional vector.

4 Claims, 8 Drawing Sheets

| Transmitting Node (prefix) | Receiving Node (prefix) | Usage | Peg Count | Holding Time | Overflow Rate |
|---|---|---|---|---|---|
| | | | | | |
| | | | | | |
| | | | | | |
| | | | | | |

Fig. 10

| Transmitting Node (prefix) | Receiving Node (prefix) | Number of Installed Lines | Number of Available Lines |
|---|---|---|---|
| | | | |
| | | | |
| | | | |
| | | | |

Fig. 11

| Exchanging Node (prefix) | Total Originating Outgoing Traffic | Total Terminating Incoming Traffic |
|---|---|---|
| | | |
| | | |
| | | |
| | | |

Fig. 12

| Originating Node (prefix) | Terminating Node (prefix) | Number of Attempt Routes | Receiving Termination of First Attempt Routes(prefix) | Receiving Termination of Second Attempt Routes (prefix) | ... |
|---|---|---|---|---|---|
| | | | | | |
| | | | | | |
| | | | | | |
| | | | | | |

Fig. 13

Analysis of Estimated Result (Mean Weight of Relatively Estimated Errors : 6.30%)

| Point-to-Point Traffic (Erlang) | Number of Point-to-Point Pairs | Mean Weight of Relatively Estimated Errors | Relatively Estimated Errors | Standard Deviation of Relatively Estimated Errors |
|---|---|---|---|---|
| (50, ∞) | 141 | 2.73% | 2.75% | 0.07% |
| (10, 50) | 2107 | 2.91% | 3.05% | 0.09% |
| (5, 10) | 2746 | 4.56% | 4.62% | 0.13% |
| (1, 5) | 8108 | 10.59% | 12.34% | 0.23% |
| (0, 1) | 5239 | 49.67% | 154.7% | 7.89% |

Fig. 14

SYSTEM FOR ESTIMATING POINT-TO-POINT TRAFFIC DEMAND

BACKGROUND OF THE INVENTION

1. Field of the Invention

The present invention relates to a system for a point-to-point traffic demand estimation, which is one of the data analyzing procedures necessary for network management, on the basis of measured traffic data for communications network, and more particularly to a system for calculating measured traffic data used for point-to-point traffic demand estimation and directional vectors in the procedure of using the measured traffic data and iterating the demand estimation.

2. Description of the Prior Art

Traffic demand of telephone subscribers who are placing calls from one specified telephone company exchange to another subscriber in a different exchange is an essential element in fields such as network dimensioning and administration, capacity planning and route planning. When subscriber's attempted call fails, it is reattempted. In this case, the point-to-point traffic demand can be calculated from an appropriate reattempt model and from the point-to-point offered traffic. However, it is impossible to directly measure the point-to-point offered traffic. To this end, research institutes in various countries, including Bellcore, are researching a method for indirectly estimating the point-to-point offered traffic using route traffic data, exchange traffic data and routing rule.

Traffic data, which is usable to calculate the point-to-point traffic in a network, includes route traffic data (including usage, overflow rate, holding time and peg count) and office traffic data (including ORG-OG, OR,G-TERM, INC-OG and INC-TERM). Constraints capable of being made using the traffic data include the route traffic constraint and the office total constraint. The rate of using an optional route is the summation of rates of using all point-to-point traffic using the route. The office total constraint is based on the fact that the total originating outgoing (ORG-OG) traffic measured at an optional exchange is the summation of point-to-point traffic from the exchange with respect to all incoming exchanges whereas the total terminating incoming traffic is the summation of point-to-point traffic to the exchange with respect to all originating exchanges.

The "Martin TU" method and the "Kim Rou Sik" method are known as a conventional method for estimating point-to-point traffic demand. These methods take the above-mentioned constraints into consideration. The "Martin TU" method derives solutions of simultaneous equations established on the basis of constraints by using the Gauss-seidel iteration method. The "Kim Rou Sik" method involves a procedure of simply iterating the steps of deriving the directional vector and step size, updating an estimated value and checking the stop condition. At each iteration step, the estimated point-to-point traffic demand satisfies the office total constraint. The directional vector is calculated, based on the link traffic constraint Both the "Martin TU" and "Kim Rou Sik" methods have the disadvantage that the number of independent simultaneous equations capable of being established is smaller than the number of unknown quantities. In this case, the simultaneous equations have numerous solutions. This problem cannot be mathematically solved unless constraints formulated in the numerical equation form are added. Accordingly, the "Martin TU" and "Kim Rou Sik" methods can derive more useful solutions as the number of simultaneous equations is more approximate to the number of unknown quantities, that is, as the network has a higher connectivity. It has been known that because of the characteristic of the routine for deriving the directional vector, the "Kim Rou Sik" method can derive useful solutions when the generation pattern of each point-to-point traffic is relatively homogeneous.

SUMMARY OF THE INVENTION

Therefore, an object of the invention is to provide a system for estimating a point-to-point traffic demand, being capable of discovering new constraints and finding an appropriate directional vector to solve the multi-solution problem occurring in a network: using a distributed static bypass routing scheme when the number of constraints is smaller than the number of unknown quantities, thereby obtaining point-to-point traffic data being useful as essential information in fields such as network management, control and design.

In accordance with one aspect, the present invention provides a method for estimating point-to-point offered traffic, comprising the steps of: setting an initial point of an estimated value as zero; iteratively and temporarily incrementing the estimated value by the product of a directional vector by a step size; and comparing constraints using both the incremented estimated value and the directional vector.

In accordance with another aspect, the present invention provides a system for estimating point-to-point offered traffic, comprising: means for setting an initial point of an estimated value as zero; means for iteratively and temporarily incrementing the estimated value by the product of a directional vector by a step size; and means for comparing constraints using both the incremented estimated value and the directional vector.

BRIEF DESCRIPTION OF THE DRAWINGS

Other objects and aspects of the invention will become apparent from the following description of embodiments with reference to the accompanying drawings in which:

FIG. 10 is a diagram illustrating a network topology table according to the present invention;

FIG. 11 is a diagram illustrating a measured route traffic data table according to the present invention;

FIG. 12 is a diagram illustrating a measured office traffic data table according to the present invention;

FIG. 13 is a diagram illustrating a routing rule table according to the present invention; and FIG. 14 is a diagram illustrating the result of the estimation according to the present invention.

DETAILED DESCRIPTION OF THE PREFERRED EMBODIMENTS

The following notations are defined to describe a point-to-point traffic estimation method according to the present invention.

"s" and "d" are source and destination nodes for a specific call attempt, respectively. "f" is an identification number of the termination of the first attempt route at the origination node. "$v_{ij}$" is measured overflow rate on the route (i,j). "$b_{ikl}$" is a call blocking probability for the point-to-point offered traffic from node i to node j. "$I_{ij}$" represents the rate that the facilities of the route (i,j) are used by the point-to-point traffic offered from node s to node d. To calculate the blocking probability based on the measured route overflow rate and routing rule, the following two assumptions are made.

The first assumptions are made is a "same overflow opportunity" assumption. In accordance with this assumption, calls from different origination-destination pairs see the same overflow rate on each route (i,j).

Figure 1:
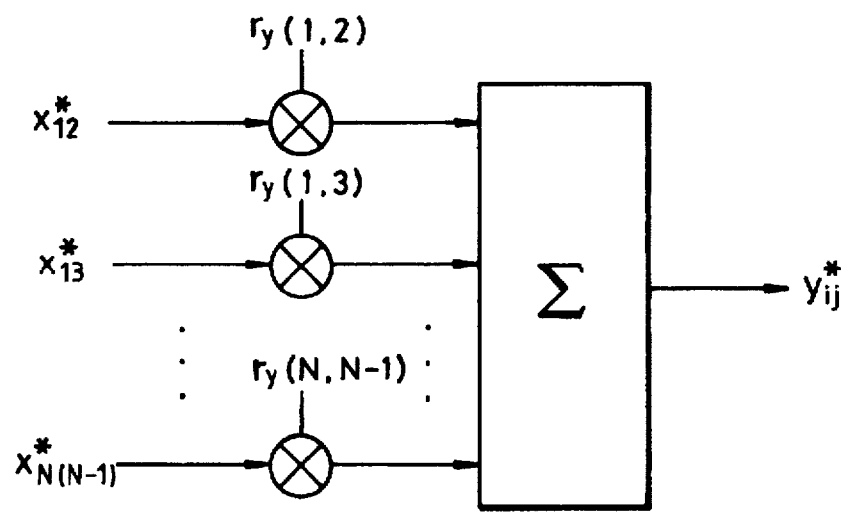
FIG. 1 is a diagram illustrating the relationship between measured values of the point-to-point offered traffic and route traffic in accordance with the prior art.

The second assumption is a "route process independence" assumption. In accordance with this assumption, it is assumed that if a specific call experiences overflow on either route it is independent from the experience of overflow on the other route.

Where these assumptions are applied to a simple network, in which routes (1,2) and (2,3) are connected in series, the call blocking probability "$b_{13}$" for each point pair corresponds to "$v_{12} + v_{23}(1-v_{12})$". In this case, "$r_{12}(1,3)$" corresponds to "$1-b_{13}$". On the other hand, "$x_{ikl}*$" represents a measured value of point-to-point represents a measured value for the route (i, j) used by calls which FIG. 1 shows the relationship between "$x_{sd}*$" and "$y_{ij}*$". "$o_s*$" and "$t_d*$" represent respective measured values of total offered traffic originated from node s and total carried traffic terminated to node d.

Figure 2:
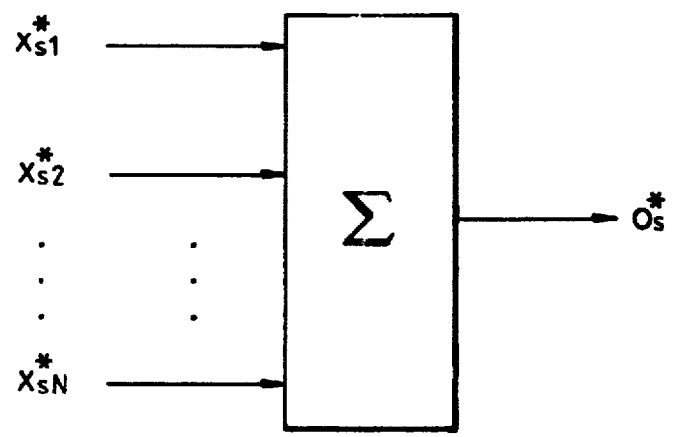
FIG. 2 is a diagram illustrating the relationship between the point-to-point offered traffic and total originating outgoing traffic measured in an exchange in accordance with the prior art;.
Figure 3:
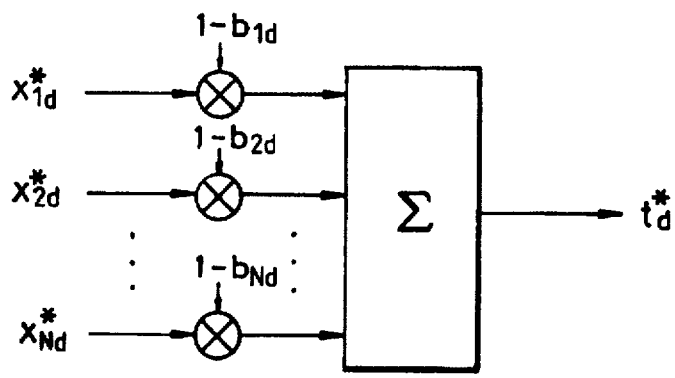
FIG. 3 is a diagram illustrating the relationship between the real point-to-point offered traffic and total terminating incoming traffic measured in an exchange.

FIGS. 2 and 3 show the relationship between "$o_s*$" and "$x_{sd}*$" and the relationship between "t*d" and "$x_{sd}*$", respectively. "$x_{sd}$" represents an estimated value of point-to-point offered traffic. "x" is defined as a matrix consisting of "$x_{sd}$" for each point-to-point pair whereas O, T and Y are defined as matrixes consisting of "$o_s$", "$t_d$" and "$y_{ij}$", respectively.

Figure 4:
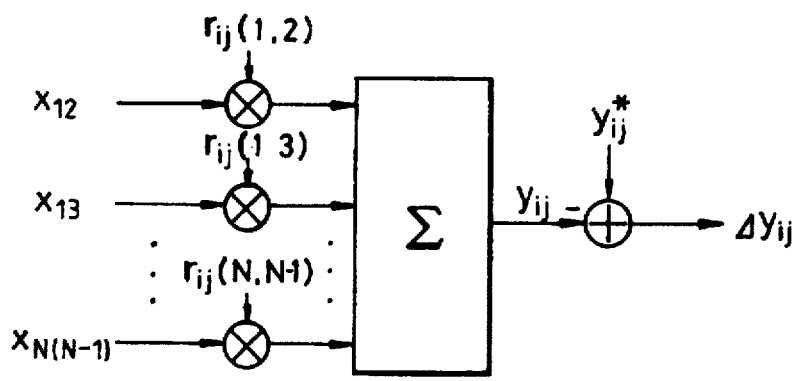
FIG. 4 is a diagram illustrating a method for calculating route traffic and its error from estimated point-to-point offered traffic data.

FIG. 4 shows a method for calculating "$y_{ij}$" from "$x_{sd}$" and "$I_{ij}(s,d)$" and a method for calculating "$\Delta y_{ij}$" from "$y_{ij}*$" and "$y_{ij}$". In the case of FIG. 4, the relationship between "$x_{sd}$" and "$y_{ij}$" can be expressed by the functional equation of $Y=R(X)$.

Figure 5:
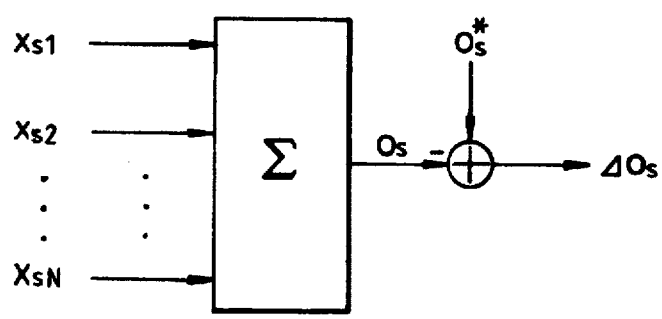
FIG. 5 is a diagram illustrating a method for calculating total originating outgoing traffic for a specific exchanging node and its error from estimated point-to-point offered traffic data.

FIG. 5 shows a method for calculating "$o_s$" from "$x_{sd}$" and a method for calculating "$\Delta o_s$" from "$o_s*$" and "$o_s$". In the case of FIG. 5, the relationship between "$\Delta o_s$" and "$o_s$" can be expressed by the functional equation of $O=G(X)$.

Figure 6:
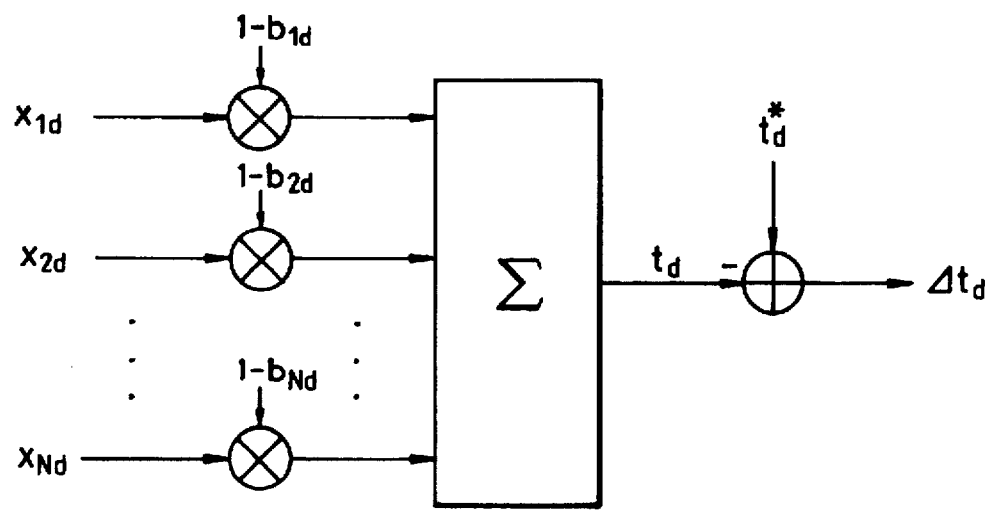
FIG. 6 is a diagram illustrating a method for calculating total terminating incoming traffic for a specific exchanging node and its error from estimated point-to-point offered traffic data.
Figure 7:
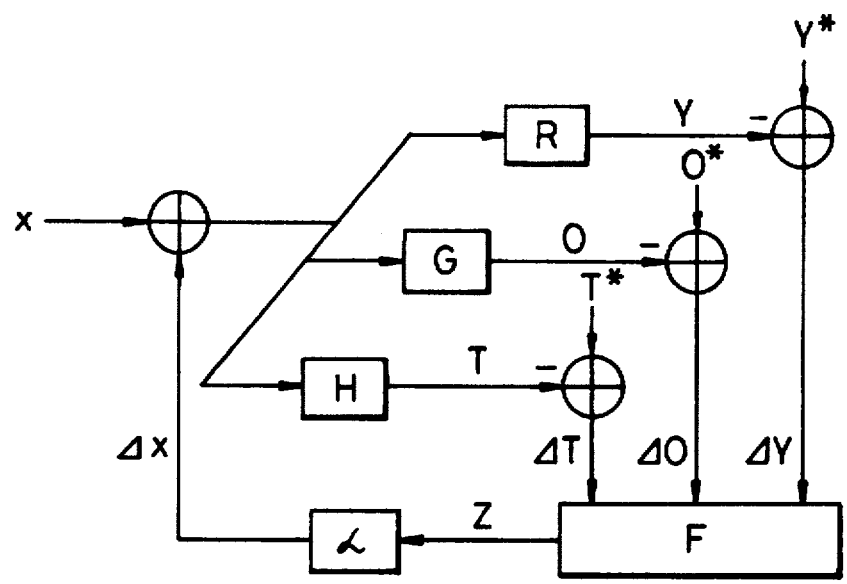
FIG. 7 is a flow chart illustrating estimation steps of a point-to-point traffic estimating method according to the present invention.

FIG. 6 shows a method for calculating "$t_d$" from "$x_{sd}$" and "$b_{13}$" and a method for calculating "$\Delta t_d$" from "$t_d*$" and "$t_d$". In the case of FIG. 6, the relationship between "$x_{sd}$" and "$t_d$" can be expressed by the functional equation of $T=H(X)$ For thee estimation of point-to-point offered traffic, three constraints, namely, route traffic constraint, office total constraint and routing scenario constraint are used. The route traffic constraint constrains "$y_{ij}$", output when an estimated value "$x_{sd}$" is applied to the case of FIG. 4, to be equal to "$y_{ij}*$". The office total constraint constrains "$o_s$" and "$t_d$", respectively output when the estimated value "$x_{sd}$" is applied to the cases of FIGS. 5 and 6, to be equal to "$o_s*$" and "$t_d*$". The number of simultaneous equations capable of being established on the basis of the route traffic constraint is equal to the total number of routes, L, whereas the number of equations capable of being established on the basis of the office total constraint is equal to or smaller than twice the number of nodes, N. Accordingly, the number of simultaneous equations capable of being established on the basis of the above two constraints is equal to or smaller than "L+2N". The number of unknown quantities, which is "Nx(N-1), is larger than the number of simultaneous equations in most cases except for complete networks. For this reason, there are multiple solutions of the above two constraints. Since two or more kinds of routing schemes can satisfy both the above constraints, this specific routing scheme is adopted as a new constraint in accordance with the present invention. Since the routing scheme is hard to formulate in the mathematical form, a heuristic approach is chosen in accordance with the present invention.

The heuristic point-to-point offered traffic estimation involves a procedure of simply iterating the steps of deriving the directional vector and step size, updating an estimated value and checking the stop condition. This estimation method utilizes a method for temporarily incrementing the estimated value of point-to-point traffic for each origination-destination pair by a small increment. By calculating the route using rate, total terminating incoming traffic and total originating outgoing traffic estimated when all estimated values of point-to-point traffic are temporarily incremented at the same time, this method allows an increase in the estimated value for point-to-point pairs which do not use routes each causing its use rate to exceed the real value or exchange nodes each causing its traffic value to exceed the real value. Before the iteration procedure is initiated, an initial point of X is derived. If there is a point pair exclusively using the first attempt route, the offered traffic of such a point pair is the same as the offered traffic of the first attempt route. Accordingly, the estimated value of such a point pair is defined as the offered traffic of the first attempt route whereas initial points of the remaining point pairs are defined as zero. Thereafter, "$r_{sij}(s,d)$" for each route (i,j) is derived by measuring the route using a rate obtained when traffic of j erlang flows in a network having the measured route overflow rate for each point pair (s,d) in accordance with the routing rule. The current value x is then applied to FIGS. 4 to 6 to calculate Y, O, T, $\Delta Y$, $\Delta O$ and $\Delta T$. Using $\Delta Y$, $\Delta O$, $\Delta T$ and "$r_{ij}(s,d)$", the directional vector Z is then derived. To derive the directional component "$Z_{sd}$" for each point-to-point pair (s,d), its first attempt route (s,f) is taken into consideration. The summation of values "$r_{ij}(s',d')$ * $(\Delta o_s + t_d)$" for all point pairs using the route (s,f) is defined as "A" whereas "$r_{ij}(s,d) * (\Delta o_s + t_d)$" is defined as "B". The traffic of the route (s,f) may be assumed as being formulated by traffic of point-to-point (s',d') in proportion to "$r_{ij}(s,d) * (\Delta o_s + t_d)$". This is because the traffic of point-to-point pairs having higher values of "$r_{ij}(s,d) * (\Delta o_s + t_d)$" has a probability that they are applied to the route (s,f) in a larger amount. Taking this fact into consideration, that of "$\Delta y_{sd}$" for the first attempt route estimated as being associated with the point-to-point pair (s,d) is multiplied by "B" and then divided by "A". The resulting value is defined as a directional component "$x_{sd}$" for the point-to-point pair (s,d). The temporary directional vector Z derived in such a manner is then multiplied by an steps size $\alpha$. The resulting value is added to the currently estimated value X. The a resulting value is defined as a temporary value of X. The temporary value of X is then applied to FIGS. 4 to 6 to derive $\Delta Y$, $\Delta O$ and $\Delta T$. For the remaining point-to-point pairs except for the point-to-point pairs (s,d) having positive "$\Delta y_{sd}$" for routes being used and positive "$\Delta o_s$" and "$t_d$", their directional components are corrected to be zero. In such a manner, the directional vector Z is derived. Thereafter, the directional vector Z is multiplied by an appropriate step size $\alpha$ and then added to the currently estimated value X. The resulting value is defined as a newly estimated value of X. The procedure is then iterated from the step of calculating Y, O and T using the newly estimated value of x along with FIGS. 4 to 6. The iteration procedure is carried out until an value obtained by adding the summation of absolute values of "$\Delta o_s$" and "$\Delta t_d$" for all nodes to the summation of estimated errors for the constraints, namely, absolute values of "$\Delta y_{ij}$" for all routes (i,j) is reduced no longer.

We have tested the heuristic point-to-point traffic estimation algorithm on a sparse network having the connectivity of about 0.5175. The network includes 61 local exchanges having both incoming and outgoing function, 85 combined exchanges having both the incoming and outgoing function and the tandem function, and 2 pure tandem exchanges. That is, the network totally includes 148 exchanging nodes. More than 48% of origination destination pairs use the tandem exchanges as their first trials. In order to acquire the traffic input data to use to evaluate the performance of point-to-point traffic estimation algorithm, the network was simulated for 3,900 seconds. The statistical data affected by the calls generated past 300 seconds was also measured. It was assumed that the conversation time of all calls is 78 seconds on the average, and the distributions of point-to-point offered loads follow the Poisson process. The route traffic data and office data measured as the result of the above simulation are used as input data for estimating the point-to-point traffic.

Figure 8:
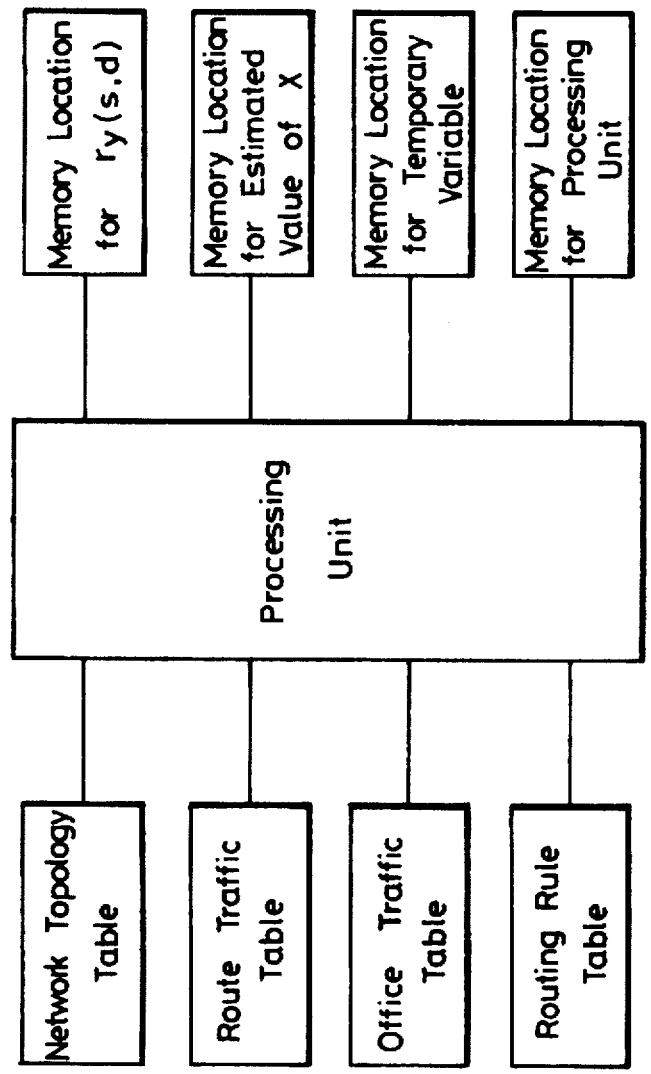
FIG. 8 is a block diagram illustrating the hardware for carrying out the point-to-point traffic estimating method according to the present invention.
Figure 9:
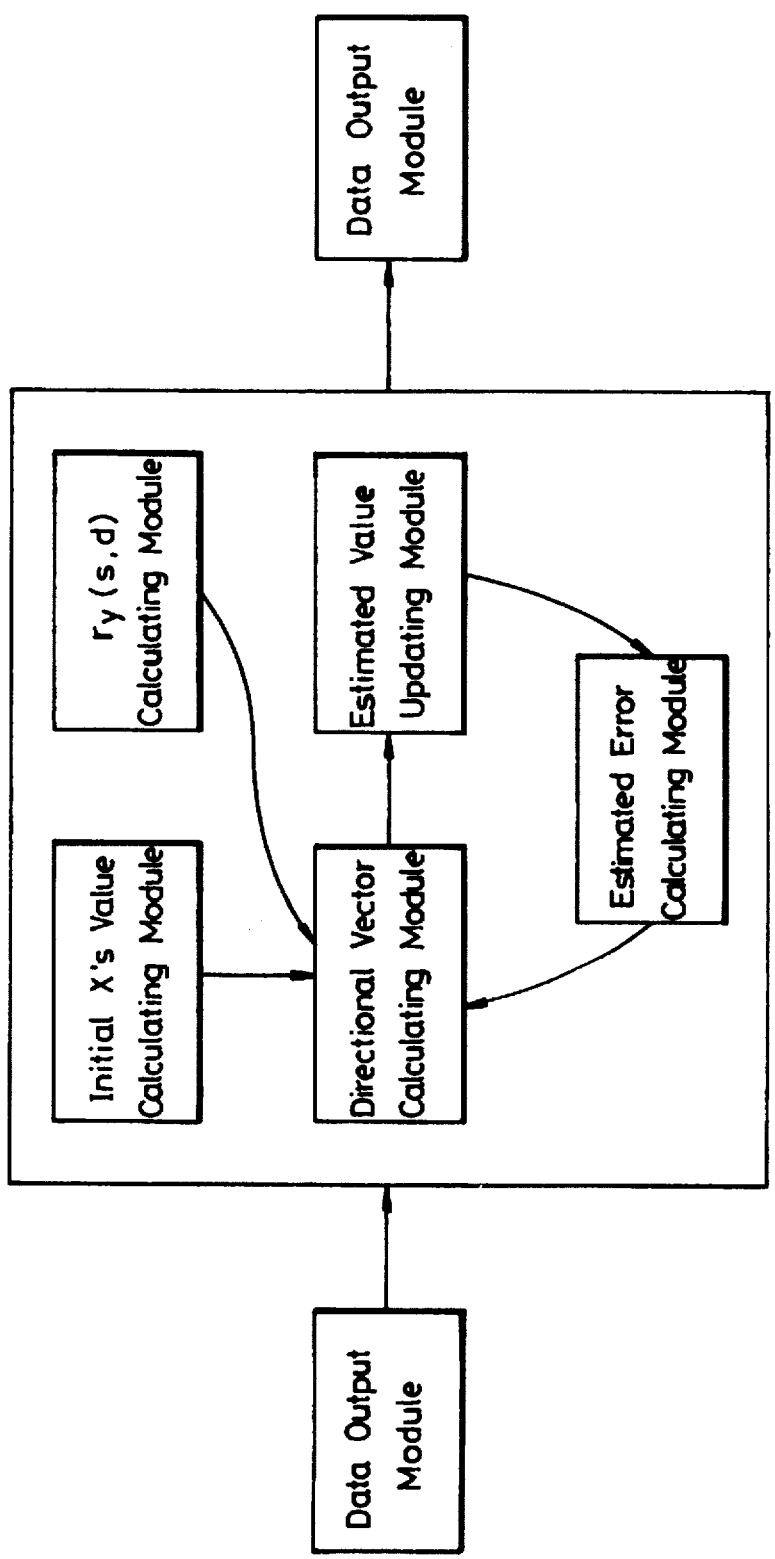
FIG. 9 is a block diagram illustrating functional modules for carrying out the point-to-point traffic estimating method according

FIG. 8 is a block diagram illustrating the hardware for carrying out the point-to-point traffic estimating method according to the present invention whereas FIG. 9 is a block diagram illustrating functional modules for carrying out the point-to-point traffic estimating method. Programs for the processing procedures of the modules shown in FIG. 9 are stored in a memory location for the processing unit shown in FIG. 8. The hardware of FIG. 8 includes an input which reads network topology data, measured route traffic data, measured office traffic data and routing rule data from associated files and stores them in tables, respectively. FIGS. 10 to 13 are diagrams illustrating a network topology table, a route traffic table, office traffic table and a routing rule table, respectively. The point-to-point traffic data estimated using the Heuristic point-to-point offered traffic estimating method is shown in FIG. 14. Referring to FIG. 14, it can be found that the mean weight of relatively estimated errors for each point-to-point pair, that is, the mean estimated error is about 6.30%.

As apparent from the above description, the present invention provides a method of and a system for a point-to-point traffic demand estimation capable of easily finding a new constraint and directional vector by initializing an initial point of an arbitrary estimated value, and then iteratively and temporarily incrementing the value by the product of the directional vector by the step size. Accordingly, it is possible to efficiently attain point-to-point traffic data being useful as essential data in fields such as network administration, control and design.

Although the preferred embodiments of the invention have been disclosed for illustrative purposes, those skilled in the art will appreciate that various modifications, additions and substitutions are possible, without departing from the scope and spirit of the invention as disclosed in thee accompanying claims.

What is claimed is:

1. A method as executed on a processing unit for estimating point-to-point offered traffic along routings in a network, comprising the steps of:

setting an initial point of an estimated value as zero;

iteratively and temporarily incrementing the estimated value by the product of a directional vector by a step size, determining an adjusted directional vector based upon the temporarily incremented estimated value;

incrementing the estimated value by the product of an adjusted directional vector by a step size; and repeating the iterative steps until stop conditions are met;

wherein results relating to the point-to-point traffic obtained and said traffic in said network is directed along bypass routings.

2. The method in accordance with claim 1, wherein the step of setting the initial point of the estimated value comprises the step of determining an estimated value for a point-to point pair exclusively using a first attempt route as an offered traffic of the first attempt route.

3. The method in accordance with claim 1 wherein the determining on adjust directional valve step further comprising the steps of:

determining an updated Y, the amount of traffic in which attempted calls connect, and $\Delta Y$, the difference between the undated Y and the volume of Y from prior iteration, using the temporarily incremented estimated value:

determining an updated O, the value of the total amount of traffic originating at a node; and an updated $\Delta O$, the difference between the updated O and the value of O from prior iteration, using the temporarily incremental estimated value;

determining an updated T, the value of the total amount of traffic terminating at a node, and an updated $\Delta T$, the difference between the updated T and the value of T from prior iteration, using the temporarily incremented estimated value; and determine a temporary directional vector, Z, using the updated $\Delta O$, T, and $r_{ij}(s,d)$, the rate that facilities are used by point-to-point traffic offered from a source to destination.

4. A system for estimating point-to-point traffic, comprising a processing unit including:

means for setting an initial point of an estimated value as zero;

means for iteratively and temporarily incrementing the estimated value by the product of a directional vector by a step size;

means for determining an adjusted directional vector based upon the temporarily incremented estimated value;

means for incrementing the estimated value by the product of an adjusted directional vector by a step size; and means for repeating the interative stops until stop conditions are met.

wherein said comparing means provides results relating to point-to-point traffic.

* * * * *